(12) United States Patent
Sone et al.

(10) Patent No.: US 6,639,030 B2
(45) Date of Patent: Oct. 28, 2003

(54) PROCESS FOR PRODUCTION OF OLEFIN POLYMER

(75) Inventors: Makoto Sone, Mie (JP); Saiki Hasegawa, Yokkaichi (JP); Satoru Yamada, Mie (JP); Akihiro Yano, Yokkaichi (JP)

(73) Assignee: Tosoh Corporation, Shinnanyo (JP)

( * ) Notice: Subject to any disclaimer, the term of this patent is extended or adjusted under 35 U.S.C. 154(b) by 29 days.

(21) Appl. No.: 08/545,254

(22) Filed: Oct. 19, 1995

(65) Prior Publication Data

US 2003/0073789 A1 Apr. 17, 2003

(30) Foreign Application Priority Data

Oct. 25, 1994 (JP) .............................. 6-260223

(51) Int. Cl.$^7$ ................................ C08F 4/642
(52) U.S. Cl. .................. 526/127; 526/126; 526/132; 526/133; 526/151; 526/153; 526/160; 526/348.5
(58) Field of Search ................ 526/126, 127, 526/132, 133, 151, 153, 160, 348.5

(56) References Cited

U.S. PATENT DOCUMENTS 5,369,196 A * 11/1994 Matsumoto et al. ........ 526/160
5,434,115 A    7/1995 Yamada et al.
5,545,829 A *  8/1996 Brekner et al. ............. 526/127

FOREIGN PATENT DOCUMENTS

| EP | 0 530 908 | 3/1993 |
| EP | 0 537 130 | 4/1993 |
| EP | 0 570 982 | 11/1993 |
| EP | 612768 | * 8/1994 |
| EP | 0 628 577 | 12/1994 |

OTHER PUBLICATIONS

Makromol. Chem.: Macromol. Symp., vol. 48/49, pages 253–295, Aug. 1991, John A. Ewen, et al., "Metallocene/Polypropylene Structural Relationships: Implications on Polymerization and Stereochemical Control Mechanisms".

* cited by examiner

Primary Examiner—Fred Teskin
(74) Attorney, Agent, or Firm—Oblon, Spivak, McClelland, Maier & Neustadt, P.C.

(57) ABSTRACT

A process for production of an olefin polymer is provided which comprises polymerization of ethylene and/or α-olefin of three of more carbons at a polymerization temperature of not lower than 120° C. with a catalyst comprising a specific metallocene compound having a substituted fluorenyl group, and a compound which reacts with the metallocene compound to form a cationic metallocene compound. The olefin polymer or copolymer produced by the process has narrow composition distribution, narrow molecular weight distribution, and a high molecular weight.

15 Claims, No Drawings

PROCESS FOR PRODUCTION OF OLEFIN POLYMER

BACKGROUND OF THE INVENTION

1. Field of the Invention

The present invention relates to a process for producing an olefin polymer of high molecular weight by cloying a catalyst comprising a metallocene compound having a substituted fluorenyl group as one ligand, a cyclopentadienyl group as another ligand, and a silanediyl group forming a bridge between the two ligands at a high polymerization temperature of not lower than 120° C.

2. Description of the Related Art

In polymerization of olefin, metallocene complex catalysts are known to be highly active which comprise as fundamental constitutional components a cyclopentadienyl derivative of a transition metal such as titanium, zirconium, and hafnium (Group 4 of Periodic Table) and an aluminoxane. Such catalysts are described by J. Boor ("Ziegler-Natta Catalyst and Polymeriation", Academic Press, New York (1979)) and by B. Sinn and W. Kaminsky (Adv. Organomet. Chem. 1899 (1980)). These catalysts are shown to be highly active in olefin polymerization and to be capable of forming a stereoregular polymer. JP-A-1-503788 ("JP-A" herein means "Japanese Patent Laid-Open Publication") discloses a process for producing a polyethylene of high density or an ethylene/α-olefin copolymer of relatively high density by employing the aforementioned catalyst system comprising a metallocene compound and aluminoxane at a high pressure and a high temperature.

These catalysts, however, are not employed in commercial production, mainly because of two disadvantages below. Firstly, aluminoxane, the cocatalyst, cannot readily be prepared with sufficient reproducibility, whereby the catalyst and the resulting polymer cannot be produced with appropriate reproducibility. Secondary, the expensive aluminoxane has to be used in an extremely high ratio to the transition metal compound, the main catalyst, in order to obtain high catalytic activity and stability of polymerization.

The above disadvantages are offset by an ionic metallocene catalyst. JP-A-3-207704 discloses an ionic metallocene compound prepared by reaction of a metallocene compound with an ionizing ionic compound. WO-92-01723 discloses a process for polymerization of a-olefin with a catalyst system prepared by reacting a halogenated metallocene compound with an organometallic compound and further bringing the resulting product into contact with an ionizing ionic compound, and describes advantages of such a catalyst system for olefin polymerization.

JP-A-5-320246 discloses high temperature polymerization with an ionic metallocene catalyst, where the polymerization catalyst is prepared from known dicyclopentadienylzirconium dichloride, dimethylanilinium tetra(pentafluorophenyl)borate, and triisobutylaluminum. However, ethylene/1-octene copolymers produced with this catalyst at high temperature have a low intrinsic viscosity, namely a low molecular weight. Therefore, the polymer produced with this catalyst is presumed to be insufficient in rigidity and strength for single use for plastics.

Generally, a polymer of a higher molecular weight is obtained at a lower polymerization temperature because of slower chain transfer reactions at a lower temperature. However, in polymerization at a temperature lower than the melting temperature of the polymer, the formed polymer deposits in the reaction vessel to retard agitation and to reduce the productivity. In solution polymerization where the polymerization is conducted at a temperature higher than the melting point of the polymer, the above disadvantages are offset, and the higher temperature gives lower viscosity of the polymerization solution to raise the agitation efficiency, thereby enabling production of a homogeneous polymer, and facilitating removal of polymerization heat and control of the reaction. In high-temperature high-pressure polymerization, the larger the difference between the temperature of polymerization and the temperature of the feed of raw materials, the higher will the olefin conversion be, and the larger will the economical profit be. Accordingly, for high temperature polymerization, the metallocene catalyst is being investigated which is active under high temperature conditions.

SUMMARY OF THE INVENTION

The present invention intends to provide a process for production of an olefin polymer having narrow composition distribution, narrow molecular weight distribution, and a high molecular weight.

The process for production of an olefin polymer of the present invention comprises polymerization of ethylene and/or αa-olefin of three of more carbons at apolymerization temperature of not lower than 120° C. with a catalyst comprising:

(a) a metallocene compound having a substituted fluorenyl group represented by general formula (1):

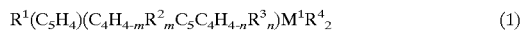

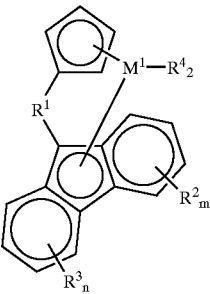

wherein $R^1$ is a silanediyl group which forms a bridge between the $C_5H_4$ group and the $C_4H_{4-m}R^2_m C_5 C_4 H_{4-n} R^3_n$ group to raise steric rigidity of the compound of general formula (1); $C_5H_4$ is a cyclopentadienyl group; $C_4H_{4-m}R^2_m C_5 C_4 H_{4-n} R^3_n$ is a substituted fluorenyl group; $R^2$ and $R^3$ are independently a substituent on benzo ring moiety of the substituted fluorenyl group, and is an alkyl group, a halogenated alkyl group, an aryl group, or a halogenated aryl group; $M^1$ is Ti, Zr, or Hf; each of $R^4$ is independently a hydrogen atom, a hydrocarbon group, an amino group of 1 to 20 carbons, an oxygen-containing hydrocarbon group of 1 to 20 carbons, or a halogen; m is an integer of from 0 to 4; and n is an integer of from 0 to 4; and (b) a compound which reacts with the metallocene compound to form a cationic metallocene compound. The catalyst system may further comprise (c) an organometallic compound.

DETAILED DESCRIPTION OF THE PREFERRED EMBODIMENT

The process of the present invention is described below in detail.

The metallocene compound employed in the present invention is represented by general formula (1):

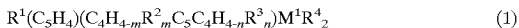

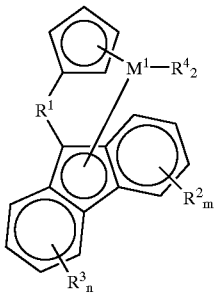

wherein $R^1$ is a silanediyl group which forms a bridge between the C5H4 group and the C4H4-mR2mC5C4H4-nR3n group to raise steric rigidity of the compound of general formula (1). The silanediyl group includes dialkylsilanediyl-groups, diarylsilanediyl groups, and alkylarylsilanediyl groups. Specifically, the dialkylsilanediyl groups include dimethylsilanediyl, diethylsilanediyl, and cyclopropylsilanediyl; and the diarylsilanediyl groups and the alkylarylsilanediyl groups include phenylmethylsilanediyl diphenylsilanediyl, ditolylsilanediyl, and dinaphthylsilanediyl. In view of suppression of molecular vibration of the substituted fluorenyl group or the cyclopentadienyl group as the ligands, preferably a single silicon atom forms a bridge between the cyclopentadienyl moiety and the 9-position of the substituted fluorenyl group, and a phenyl group derivative is bonded to the bridging atom. Such a group is exemplified by a diphenylsilanediyl group, a ditolylsilanediyl group, and a dinaphthylsilanediyl group.

The fluorenyl skeleton is represented by general formula (2):

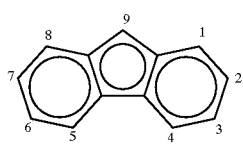

where the attached numbers shows the positions of substitution in the fluorenyl skeleton.

$R^2$ and $R^3$ are independently a substituent on the benzo ring moiety of the substituted fluorenyl group, and is an alkyl group, a halogenated alkyl group, an aryl group, or a halogenated aryl group, specifically including groups of methyl, ethyl, propyl, butyl, pentyl, hexyl, heptyl, octyl, nonyl, decyl, isopropyl, isobutyl, isopentyl, phenyl, methylphenyl, ethylphenyl, tolyl, methyltolyl, benzyl, naphthyl, cyclopropyl, cyclobutyl, cyclopentyl, cyclohexyl, and the like, and those substituted by halogen.

M1 is Ti, Zr, or Hf.

Each of $R^4$ is independently a hydrogen atom, a hydrocarbon group such as methyl, ethyl, propyl, butyl, pentyl, hexyl, heptyl, octyl, nonyl, decyl, isopropyl, isobutyl, isopentyl, phenyl, methylphenyl, ethylphenyl, tolyl, methyltolyl, benzyl, naphthyl, cyclopropyl, cyclobutyl, cyclopentyl, and cyclohexyl; an amino group of 1 to 20 carbons such as dimethylamino, diethylamino, dipropylamino, dibutylamino, dipentylamino, dihexylamino, diheptylamino, dioctylamino, dinonylamino, didecylamino, diisopropylamino, diisobutylamino, diisopentylamino, diphenylamino, methylphenylamino, ethylphenylamino, ditolylamino, methyltolylamino, dibenzylamino, benzylmethylamino, dinaphthylamino, cyclopropylamino, cyclobutylamino, cyclopentylamino, and cyclohexylamino; an oxygen-containing hydrocarbon group of 1 to 20 carbons such as methoxy, ethoxy, propoxy, butoxy, isopropoxy, isobutoxy, phenoxy, 1-phenylmethoxy, naphthoxy, 2-methoxymethyl, and 2-methoxyethyl; or a halogen.

The symbol m is an integer of from 0 to 4; and the symbol n is an integer of from 0 to 4.

The metallocene compound includes specifically:
diphenylsilanediyl(cyclopentadienyl)(fluorenyl)zirconium dichloride,
diphenylsilanediyl(cyclopentadienyl)(2-methylfluorenyl)-zirconium dichloride,
diphenylsilanediyl(cyclopentadienyl)(2-ethylfluorenyl)-zirconium dichloride,
diphenylsilanediyl(cyclopentadienyl)(2-isopropylfluorenyl)-zirconium dichloride,
diphenylsilanediyl(cyclopentadienyl)(2-t-butylfluorenyl)-zirconium dichloride,
diphenylsilanediyl (cyclopentadienyl) (4-methyifluorenyl)-zirconium dichloride,
diphenylsilanediyl(cyclopentadienyl)(4-ethylfluorenyl)-zirconium dichloride
diphenylsilanediyl(cyclopentadienyl)(4-isorpopylfluorenyl)-zirconium dichloride,
diphenylsilanediyl(cyclopentadienyl)(4-t-butylfluorenyl)-zirconium dichloride,
diphenylsilanediyl(cyclopentadienyl) (2-phenylfluorenyl)-zirconium dichloride,
diphenylsilanediyl(cyclopentadienyl)(2-naphthylfluorenyl)-zirconium dichloride,
diphenylsilanediyl(cyclopentadienyl)(2,7-bismethylfluorenyl zirconium dichloride,
diphenylsilanediyl(cyclopentadienyl)(2,7-bisethylfluorenyl) zirconium dichloride,
diphenylsilanediyl(cyclopentadienyl)-2,7-bisisopropylfluorenyl)zirconium dichloride,
diphenylsilanediyl(cyclopentadienyl)(2,7-bis-t-butylfluorenyl)zirconium dichloride,
diphenylsilanediyl(cyclopentadienyl)(2,7-bisphenylfluorenyl)zirconium dichloride, and
diphenylsilanediyl(cyclopentadienyl)(2,7-bisnaphtylfluorenyl)zirconium dichloride;
the above compounds in which the central atom is Ti or Hf in place of Zr; the above compounds in which $R^4$ is methyl, ethyl, benzyl, phenyl, fluorine, bromine, iodine, or the like, but the metallocene compound is not limited thereto.

The compound which reacts with the metallocene compound to form a cationic metallocene compound includes protonic acids (3), Lewis acids (4), ionizing ionic compounds (5), Lewis-acidic compounds, and aluminoxanes (7) and (8).

Additionally, an organometallic compound (9) which has at least one alkyl group may be used for promoting formation of the cationic metallocene compound including alkylation and hydrogenation, and for protecting the formed cationic metallocene compound from a catalytic poison.

The protonic acid is a compound represented by general formula (3) below:

$$[HL^1_l][M^2R^8_4] \quad (3)$$

where H is a proton; each of $L^1$ is independently a Lewis base; $0 < l \leq 2$; $M^2$ is a boron, aluminum or gallium atom; and each of $R^8$ is independently a halogen-substituted aryl group of 6 to 20 carbons.

The Lewis acid is a compound represented by general formula (4):

$$[C][M2R^8_4] \quad (4)$$

where C is a carbonium cation or a tropylium cation; $M^2$ is a boron, aluminum or gallium atom; and each of $R^8$ is independently a halogen-substituted aryl group of 6 to 20 carbons.

The ionizing ionic compound is a compound represented by general formula (5):

$$[M^3L^2_r][M^2R^8_4] \quad (5)$$

where $M^3$ is a metal cation selected from Groups 1, 2, 8, 9, 10, 11, and of 12; each of $L^2$ is independently a Lewis base, or a cyclopentadienyl group; $0 \leq r \leq 2$; le is a boron, aluminum or gallium atom; and each of $R^8$ is independently a halogen-substituted aryl group of 6 to 20 carbons.

The Lewis-acidic compound is a compound represented by general formula (6):

$$[M^2R^8_3] \quad (6)$$

where M2 is a boron, aluminum or gallium atom; and each of $R^8$ is independently a halogen-substituted aryl group of 6 to 20 carbons.

The protonic acid (3), lewis acid (4), ionizing ionic compound (5), Lewis acidic compound (6), and aluminoxane (7) and (8) used as a component of the catalyst of the present invention are capable of reacting with the aforementioned metallocene compound to form a cationic metallocene compound and a counter anion therefor. The protonic acid represented by the general formula (3) specifically includes:
diethyloxonium tetrakis (pentafluorophenyl)borate,
dimethyloxonium tetrakis(pentafluorophenyl)borate,
tetramethyleneoxonium tetrakis(pentafluorophenyl)borate,
hydronium tetrakis (pentafluorophenyl)borate,
N,N-dimethylanilinium tetrakis(pentafluorophenyl)borate,
tri-n-butylammonium tetrakis(pentafluorophenyl)borate,
diethyloxonium tetrakis(pentafluorophenyl)aluminate,
dimethyloxonium tetrakis(pentafluorophenyl)aluminate,
tetramethyleneoxonium tetrakis (pentafluorophenyl) aluminate,
hydronium tetrakis (pentafluorophenyl)aluminate,
N,N-dimethylanilinium tetrakis(pentafluorophenyl) aluminate,
and tri-n-butylammonium tetrakis(pentafluorophenyl)-aluminate, but is not limited thereto.

The Lewis acid represented by the general formula (4) specifically includes:
trityl tetrakis(pentafluorophenyl)borate,
trityl tetrakis(pentafluorophenyl)aluminate,
tropylium tetrakis(pentafluorophenyl)borate, and
tropylium tetrakis(pentafluorophenyl)aluminate,
but is not limited thereto.

The ionizing ionic compound represented by the general formula (5) specifically includes:
lithium salts such as lithium tetrakis(pentafluorophenyl) borate, and lithium tetrakis (pentafluorophenyl) aluminate; ferrocenium salts such as ferrocenium tetrakis(pentafluoro phenyl)borate, and ferrocenium tetrakis(pentafluorophenyl)aluminate; and
silver salts such as silver tetrakis(pentafluorophenyl)borate, and silver tetrakis(pentafluoro)aluminate; and ether complexes thereof, but is not limited thereto.

The lewis acidic compound represented by the general formula (6) specifically includes:
tris(pentafluorophenyl)borane,
tris(2,3,5,6-tetrafluorophenyl)borane,
tris(2,3,4,5-tetraphenylphenyl)borane,
tris(3,4,5-trifluorophenyl)borane,
phenylbis(perfluorophenyl)borane, and
tris(3,4,5-trifluorophenyl)aluminum, but is not limited thereto.

The aluminoxane used in the present invention may be cyclic or linear, and is represented by general formula (7) or (8):

(7)

(8)

where p is an integer of 2 or more, each of $R^{10}$ is independently a hydrocarbon group, an alkylamino group, or a alkyl oxy group, and at least one of $R^{10}$ is a hydrocarbon group of 1 to 20 carbons, e,g., methyl, ethyl, propyl, butyl, octyl, isopropyl, isobutyl, decyl, dodecyl, tetradecyl, hexadecyl, etc.

The aforemetioned organametallic compound employed in the present invention contains a metal of Group 1A, 2, or 3A of Periodic Table, or Sn or Zn, and is represented by al formula (9):

$$M^4R^9_s \quad (9)$$

where M4 is an element of groups 1, 2, or 13 of Periodic Table, or Sn or Zn; and each of $R^9$ is independently a hydrogen atom, an alkyl or alkoxy group of 1 to 20 carbons, or an aryl, aryloxy, arylalkyl, arylalkoxy, alkylaryl, or alkylaryloxy group of 6 to 20 carbons, at least one $R^9$ being a hydrogen atom, an alkyl group of 1 to 20 carbons, or an aryl, arylalkyl, or alkylaryl group of 6 to 20 carbons; and a is equal to the oxidation number of $M^4$.

The compound represented by the general formula (9) specifically includes: trimethylaluminum, triethylalumnum, triisapropylaluminun, tri-n-propylaluminum, triisobutylaluminum, tri-n-butylaluminum, triamlylaluminum, dimethylaluminum ethoxide, diethylaluminum ethoxide, diisopropylaluminum ethoxide, di-n-propylaluminum ethoxide, diisobutylalumium ethoxide, di-n-butylaluminum ethoxide, dimethylaluminum hydride, diethylaluminum hydride, diisopropylaluminum hydride, di-n-propylaluminum hydride, diisobutylaluminum hydride, and di-n-butylaluminum hydride.

The catalyst may be prepared by the metallocene compound, and the compound capable of changing the metallocene compound to a cationic metallocene compound, and additionally the organometallic compound in an inert solvent, or may be prepared by bringing the compound capable of changing the metallocene to a cationic compound with the organometallic compound in the presence of a polymerizing olefin in a reactor. The order of mixing the components includes several combinations. The method of the catalyst preparation is not specially limited, provided that the cationic metallocene compound is formed.

The amount of the protonic acid, the Lewis acid, the ionizing ionic compound, or the Lewis-acidic compound to be used for preparation of the catalyst ranges preferably from 0.1 to 100 mol, more preferably from 0.5 to 30 mol, per mol of the metallocene compound. The amount of the organometallic compound used additionally is preferably not more than 100000 mol per mol of the metallocene compound. If the organometallic compound is used in an amount more than that, an ash removal treatment would be necessary. For production of a polymer of a high molecular weight with the catalyst of the present invention, the organometallic compound is preferably used in a possible smallest amount. The highest molecular weight of a polymer can be obtained by using, as the catalyst, only an ionizing ionic compound and a metallocene compound in which $R^4$ is an alkyl group or a hydrogen. However, the organometallic compound is preferably used in an amount ranging from 1 to 4000 mol per mol of the cationic metallocene compound in consideration of stabilization of the cationic metallocene compound and removal of a catalytic poison.

The amount of the aluminoxane used in preparation of the catalyst ranges preferably from 10 to 100000 mol per mol of the metallocene compound, but is not specially limited. With the amount of less than 10 mol thereof, the stability of the cationic metallocene compound may be impaired. With the amount of more than 1000000 mol thereof, an ash removal treatment would be necessary. When methylaluminoxane, a typical aluminoxane, is used for the polymerization, the amount of the aluminoxane, although not specially limited, is preferably less, and is in the range of from 10 to 10000 mol, more preferably from 10 to 4000 mol per mol of the metallocene compound in view of the activity of the catalyst and the molecular weight of the produced polymer. Further, the organometallic compound represented by the general formula (9) may be mixed at any ratio to the aluminoxane or the metallocene compound. The ratio, however, is preferably not more than 10000 mol per mol of the metallocene compound in order to obtain a high molecular weight of the resulting polymer.

The α-olefin of 3 or more carbons employed in the present invention includes propylene, 1-butene, 4-methyl-1-pentene, 1-hexene, 1-octene, 1-decene, 1-dodecene, 1-tetradecene, 1-hexadecene, styrene, and p-methylstyrene, and further dienes such as butadiene, 1,5-hexadiene, 1,4-hexadiene, ethylidenenorbornene, and vinylidenenorbornene, but is limited thereto. Two or more olefins may be used in combination in the polymerization.

The method of the polymerization includes solution polymerization employing a solvent, and high-temperature high-pressure polymerization, which are known techniques. For the high-pressure polymerization, reactors such as vessel-type and tube-type reactors may be used.

The solution polymerization is conducted under the polymerization conditions as follows. The polymerization temperature is not lower than 120° C. The higher temperature is considered to be advantageous in polymer productivity owing to lower solution viscosity and removal of polymerization heat. Therefore, the polymerization temperature ranges preferably from 120° C. to 300 C., more preferably from 120° C. to 250° C. to obtain a high molecular weight of the resulting polymer by retarding the drop of the molecular weight caused by chain transfer reactions which proceed more rapidly at higher temperature. The polymerization pressure is not specially limited, but is preferably in the range of from atmospheric pressure to 200 kg/cm$^2$.

The high-temperature high-pressure polymerization is conducted under the polymerization conditions as follows. The polymerization temperature is not lower than 120 C. However, from the same reason as that mentioned above regarding the solution polymerization, the polymerization temperature ranges preferably from 120° C. to 300° C. in view of the productivity, more preferably from 120° C. to 250° C. for retarding the drop of the molecular weight caused by chain transfer reactions which proceed more rapidly at higher temperature. The polymerization pressure is not specially limited, but is preferably in the range of from 500 to 3500 kg/cm$^2$ in view of the productivity of the polymer.

The present invention provides an olefin polymer having a high molecular weight, narrow molecular weight distribution, and narrow composition distribution by conducting polymerization of ethylene and/or an α-olefin by use of a metallocene catalyst of a specified structure at high temperature.

The present invention is described below in more detail by reference to examples of synthesis of the metallocene, and polymerization of olefin without limitng to the invention.

The polymerization, the reaction, and the solvent purification were conducted in an inert atmosphere of purified argon or dried nitrogen throughout the experiment. The solvent for the reactions was purified, dried, and deoxygenated in known methods. The compounds reacted had been synthesized and identified by known techniques or modification thereof.

The olefin polymers obtained were subjected to measurement by gel permeation chromatography (GPC) (apparatus: Model 150C, Waters Co.) by using a column TSK-GEL GMHHR-H(S) (Tosoh Corp.) and o-dichlorobenzene as the eluent, at a measurement temperature of 140° C. and a sample concentration of 7 mg/10 mL (o-dichlorobenzene).

EXAMPLE 1

In a one-liter reactor, was placed 600 mL of an aliphatic hydrocarbon (IP Solvent 1620, Idemitsu Petrochemical Co.) as the solvent. Thereto, 20 mL of 1-hexene was added, and the reactor was controlled to be at a temperature of 150 C. Ethylene was fed to the reactor to keep the pressure at 20 kg/cm$^2$. Separately, in another vessel, 0.75 µmol of diphenylsilanediyl(cyclopentadienyl)(fluorenyl)zirconium dichloride was dissolved in toluene, and thereto a solution of triisobutylaluminum in toluene (triisobutylaluminum concentration: 20% by weight) was added in an amount of 125 µmol in terms of aluminum. The mixture was stirred for one hour. This mixture was added to a solution of 1.5 µmol of N,N-dimethylanilinium tetrakis(pentafluorophenyl)borate in 1 mL of toluene, and the mixture was stirred for 10 minutes. The resulting mixture was introduced into the aforementioned reactor with the aid of nitrogen pressure.

After introduction of the mixture into the reactor, the content in the reactor was stirred at 1500 rpm by keeping the temperature at 150° C. for 20 minutes to allow copolymerization to proceed. The obtained reaction product was dried in vacuo at 100° C. for 6 hours. Thereby an ethylene/1-hexene copolymer was obtained in a yield of 28 g. The weight-average molecular weight (Mw) and other measured data of the resulting copolymer are shown in Table 1.

EXAMPLE 2

The copolymerization was conducted in the same manner as in Example 1 except that the ethylene pressure was changed to 6 kg/cm². The results are shown in Table 1.

EXAMPLE 3

The copolymerization was conducted in the same manner as in Example 1 except that the polymerization temperature was changed to 170° C. The results are shown in Table 1.

EXAMPLE 4

The copolymerization was conducted in the same manner as in Example 1 except that 1.5 g mol of tropylium tetrakis-(pentafluorophenyl)borate was used in place of 1.5 μmol of N,N-dimethyanilinium tetrakis(pentafluorophenyl)borate. The results are shown in Table 1.

EXAMPLE 5

The copolymerization was conducted in the same manner as in Example 1 except that 1.5 g mol of triphenylcarbenium tetrakis(pentafluorophenyl)borate was used in place of 1.5 μmol of N,N-dimethyanilinium tetrakis(pentafluorophenyl)-borate. The results are shown in Table 1.

EXAMPLE 6

[Synthesis of Diphenylsilanediyl(cyclopentadienyl)(2,7-di-t-butylfluorenyl)zirconium Dichloride]

In 1000 mL of tetrahydrofuran, was dissolved 100 mmol of diphenyl(cyclopentadienyl)(2,7-di-t-butylfluorenyl)—silane. The solution was cooled to −70 C., and thereto, 102 mmol of n-butyllithium was added dropwise. Then the temperature was raised to room temperature. The reaction mixture was stirred at room temperature for one day. The solvent, tetrahydrofuran, was evaporated off, and the residue was washed with hexane to obtain pale yellow powdery matter.

In another vessel, to 50 mmol of zirconium tetrachloride, 850 mL of diethyl ether was added. The mixture was cooled to 0 C, and agitated vigorously. Thereto, a suspension of the above powdery matter in 1150 mL of ether was added gradually. Then the temperature of the mixture was raised to room temperature. The formed solid matter was eliminated by filtration. The filtrate was cooled to −70° C. to deposit a yellow crystalline matter. The crystalline matter was collected by filtration, and was recrystallized form methylene chloride and hexane. Thereby, 26.5 g of diphenylsilanediyl-(cyclopentadienyl)(2,7-di-t-butylfluorenyl)zirconium dichloride was obtained in a yellow powder state.

[Polymerization]

In a one-liter reactor, was placed 600 mL of an aliphatic hydrocarbon (IP Solvent 1620, Idemitsu Petrochemical Co.) as the solvent. Thereto, 20 mL of 1-hexene was added, and the reactor was controlled to be at a temperature of 170° C. Ethylene was fed to the reactor to keep the pressure at 20 kg/cm².

Separately, in another vessel, 0.25 μmol of diphenylsilanediyl(cyclopentadienyl)(2,7-di-t-butyl-fluorenyl)zirconium dichloride was dissolved in toluene. Thereto a solution of triisobutylaluminum in toluene (triisobutylaluminum concentration: 20% by weight) was added in an amount of 62.5 μmol in terms of aluminum, and the mixture was stirred for one hour. This mixture was added to a solution of 0.5 μmol of N,N-dimethylanilinium tetrakis (pentafluorophenyl)borate in 0.5 mL of toluene, and the mixture was stirred for 10 minutes. The resulting mixture was introduced into the aforementioned reactor with the aid of nitrogen pressure.

After introduction of the mixture into the reactor, the content in the reactor was stirred at 1500 rpm by keeping the temperature at 170° C. for 20 minutes to allow copolymerization to proceed. The obtained reaction product was dried in vacuo at 100° C. for 6 hours. Thereby an ethylene/1-hexene copolymer was obtained in a yield of 21 g. The weight-average molecular weight and other measured data of the resulting copolymer are shown Table 1.

EXAMPLE 7

The copolymerization was conducted in the same manner as in Example 1 except that diphenylsilanediyl-(cyclopentadienyl)(2,7-di-t-butylfluorenyl)zirconium dichloride was used in place of diphenylsilanediyl-(cyclopentadienyl)(fluorenyl)zirconium dichloride. The results are shown in Table 1.

EXAMPLE 8

The copolymerization was conducted in the same manner as in Example 7 except that 20 mL of 1-butene was used in place of 20 mL of 1-hexene. The results are shown in Table 1.

COMPARATIVE EXAMPLE 1

In a one-liter reactor, was placed 600 mL of an aliphatic hydrocarbon (IP Solvent 1620, Idemitsu Petrochemical Co.) as the solvent. Thereto, 20 mL of 1-hexene was added, and the reactor was controlled to be at a temperature of 150 C. Ethylene was fed to the reactor to keep the pressure at 20 kg/cm².

Separately, in another vessel, 1.0 μmol of ethylenebis (indenyl)zirconium dichloride was dissolved in toluene, and thereto a solution of triisobutylaluminum in toluene (triisobutylaluminum concentration: 20% by weight) was added in an amount of 250 μmol in terms of aluminum. The mixture was stirred for one hour. This mixture was added to a solution of 2.0 μmol of N,N-dimethylanilinium tetrakis (pentafluorophenyl)borate in 1 mL of toluene, and the mixture was stirred for 10 minutes. The resulting mixture was introduced into the aforementioned reactor with the aid of nitrogen pressure.

After introduction of the mixture into the reactor, the content in the reactor was stirred at 1500 rpm by keeping the temperature at 150° C. for one hour to allow copolymerization to proceed. The obtained reaction product was dried in vacuo at 100° C. for 6 hours. Thereby an ethylene/1-hexene copolymer was obtained in a yield of 40 g. The weight-average molecular weight and other measured data of the resulting copolymer are shown Table 1.

COMPARATIVE EXAMPLE 2

The copolymerization was conducted in the same manner as in Comparative Example 1 except that the ethylene pressure was changed to 6 kg/cm². The results are shown in Table 1.

COMPARATIVE EXAMPLE 3

The copolymerization was conducted in the same manner as in Comparative Example 1 except that the polymerization temperature was changed to 170 C. The results are shown in Table 1.

COMPARATIVE EXAMPLE 4

The copolymerization was conducted in the same manner as in Comparative Example 1 except that 1.0 μmol of bis(cyclopentadienyl)zirconium dichloride was used in place of 1.0 μmol of ethylenebis(indenyl)zirconium dichloride. The results are shown in Table 1. Comparative Example 5

The copolymerization was conducted in the same manner as in Comparative Example 1 except that 1.0 μmol of dimethylsilanediylbis(2,4-dimethylcyclopentadienyl) zirconium dichloride was used in place of 1.0 μmol of ethylenebis(indenyl)zirconium dichloride. The results are shown in Table 1.

As shown above, the polymer produced at a polymerization temperature of not lower than 120° C. was confirmed to have a sufficiently high molecular weight.

TABLE 1

| Metal-locene | Cocat-alyst | Polymer-ization temperature (° C.) | -Olefin (mL) | Ethylene pressure (kg/cm$^2$) | Polymer yield (g) | Mw | Mw/Mn | Melting point (° C.) | Density (g/cm$^3$) | Branches (per 1000C) |
|---|---|---|---|---|---|---|---|---|---|---|
| Example |
| 1 Zr-1 | B-1 | 150 | 1-Hexene: 20 | 20 | 28 | 82100 | 2.2 | 116 | 0.925 | 6.6 |
| 2 Zr-1 | B-1 | 150 | 1-Hexene: 20 | 6 | 21 | 59800 | 2.1 | 106 | 0.909 | 15.5 |
| 3 Zr-1 | B-1 | 170 | 1-Hexene: 20 | 20 | 12 | 59200 | 1.9 | 118 | 0.927 | 8.0 |
| 4 Zr-1 | B-2 | 150 | 1-Hexene: 20 | 20 | 32 | 79900 | 2.0 | 117 | 0.925 | 6.8 |
| 5 Zr-1 | B-3 | 150 | 1-Hexene: 20 | 20 | 20 | 80500 | 2.1 | 116 | 0.924 | |
| 6 Zr-2 | B-1 | 170 | 1-Hexene: 20 | 20 | 21 | 72500 | 2.0 | 120 | 0.928 | 6.4 |
| 7 Zr-2 | B-1 | 150 | 1-Hexene: 20 | 20 | 32 | 81600 | 2.2 | 119 | 0.928 | |
| 8 Zr-2 | B-1 | 150 | 1-Butene: 20 | 20 | 33 | 84100 | 2.1 | 119 | 0.926 | |
| Comparative Example |
| 1 Zr-3 | B-1 | 150 | 1-Hexene: 20 | 20 | 40 | 20400 | 2.2 | 124 | | 5.9 |
| 2 Zr-3 | B-1 | 150 | 1-Hexene: 20 | 6 | 26 | 15400 | 2.2 | 112 | | 10.5 |
| 3 Zr-3 | B-1 | 170 | 1-Hexene: 20 | 20 | 28 | 16500 | 2.0 | 124 | | 6.3 |
| 4 Zr-4 | B-1 | 150 | 1-Hexene: 20 | 20 | 24 | 14200 | 1.9 | 126 | | 5.2 |
| 5 Zr-5 | B-1 | 150 | 1-Hexene: 20 | 20 | 21 | 23500 | 2.0 | 124 | | 5.4 |

Zr-1: Ph$_2$Si (Cp) (Flu) ZrCl$_2$
Zr-2: Ph$_2$Si (Cp) (2, 7-di-t-BuFlu) ZrCl$_2$
Zr-3: Et(Inde)$_2$ZrCl$_2$
Zr-4: Cp$_2$ZrCl$_2$
Zr-5: Me$_2$Si (2, 4-Me$_2$Cp)$_2$ZrCl$_2$
B-1: [Ph (Me)$_2$NH][B (C$_6$F$_5$)$_4$]
B-2: [C$_7$H$_7$] [B (C$_6$F$_5$)$_4$]
B-3: [Ph$_3$C][B(C$_6$F$_5$)$_4$]

What is claimed is:

1. A process for producing an olefin polymer, which comprises polymerizing ethylene or ethylene and an α-olefin of three or more carbons at a polymerization temperature or not lower than 120° C. with a catalyst, said catalyst comprising:
   (a) a metallocene compound having an unsubstituted or substituted fluorenyl group having the formula (I):

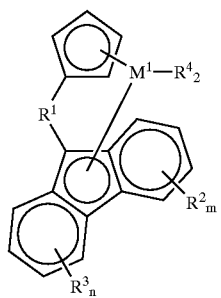

wherein $R^1$ is a diarylsilanediyl group, which forms a bridge between the $C_5H_4$ group and the $C_4H_{4-m}R^2{}_mC_5C_4H_{4-n}R^3{}_n$ group to increase steric rigidity of the compound of the formula (I); $C_5H_4$ is a cyclopentadi-enyl group; $C_4H_{4-m}R^2{}_mC_5C_4H_{4-n}R^3{}_n$ is a substituted fluorenyl group; $R^2$ and $R^3$ are independently a substituent on the benzo ring moiety of the substituted fluorenyl group and is an alkyl group, a halogenated alkyl group, an aryl group or a halogenated aryl group; $M^1$ is Ti or Zr; each of $R^4$ is independently a hydrogen atom, a hydrocarbon group, an amino group of 1 to 20 carbons, an oxygen containing hydrocarbon group of 1 to 20 carbons, or halogen; m is an integer of from 0–4; and n is an integer of from 0–4; and
   (b) a compound which reacts with the metallocene compound to form a cationic metallocene compound; and
   (c) an organometallic compound.

2. The process of claim 1, wherein the compound (b) which reacts with the metallocene compound to form a cationic metallocene compound is a protonic acid, an Lewis acid, an ionizing ionic compound, or a Lewis acidic compound, which yields the counter-anion to the metallocene.

3. The process of claim 1, wherein the compound (b) which reacts with the metallocene compound to form a cationic metallocene compound is an aluminoxane.

4. The process of claim 1, wherein the organometallic (compound comprises an organoaluminum compound.

5. The process of claim 2, wherein said protonic acid has the formula:

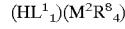

(HL$^1{}_1$)(M$^2$R$^8{}_4$)

wherein H is a proton; L$^1$ is a lewis base, wherein 0<1≦2; M$^2$ is a boron, aluminum or gallium atom; and each of R$^8$ is independently a halogen-substituted aryl group of 6 to 20 carbon atoms.

6. The process of claim 2, wherein said Lewis acid has the formula:

(C)(M$^2$R$^8{}_4$)

wherein C is a carbonium cation or tropylium cation; M$^2$ is a boron, aluminum or gallium atom; and each of R$^8$ is independently a halogen-substituted aryl group of 6 to 20 carbon atoms.

7. The process of claim 2, wherein said ionizing ionic compound has the formula:

$$(M^3L^2_r)(M^2R^8_4)$$

wherein $M^3$ is a metal cation of a metal selected from Groups 1, 2, 8, 9, 10, 11 and 12 of the Periodic Table; each of $L^2$ is independently a Lewis base or cyclopentadienyl group; $0 \leq r \leq 2$; $M^2$ is a boron, aluminum or gallium atom; and each of $R^8$ is independently a halogen-substituted aryl group of 6 to 20 carbon atoms.

8. The process of claim 2, wherein said Lewis acidic compound has the formula:

$$(M^2R^8_3)$$

wherein $M^2$ is a boron, aluminum or gallium atom; and each of $R^8$ is independently a halogen-substituted aryl group of 6 to 20 carbon atoms.

9. The process of claim 1, wherein said compound (b) is used in an amount of from about 0.1 to 100 mol per mol of metallocene compound.

10. The process of claim 1, wherein said polymerizing is conducted at a temperature of 120° C. to 300° C.

11. The process of claim 1, wherein said polymerization is conducted under pressure of either 0 to 200 kg/cm² or 500 to 3,500 kg/cm².

12. The process of claim 1, wherein $R^1$ is a diarylsilanediyl group which is selected from the group consisting of diphenylsilanediyl, ditolylsilanediyl and dinaphthylsilanediyl groups.

13. The process of claim 1, wherein said metallocene compound (a) is selected from the group consisting of diphenylsilanediyl(cyclopentadienyl)(fluorenyl) zirconium dichloride, diphenylsilanediyl(cyclopentadienyl)(2-methylfluorenyl)-zirconium dichloride, diphenylsilanediyl(cyclopentadienyl)(2-ethylfluorenyl)-zirconium dichloride, diphenylsilanediyl(cyclopentadienyl)(2-isopropylfluorenyl)-zirconium dichloride, diphenylsilanediyl(cyclopentadienyl)(2-t-butylfluorenyl)-zirconium dichloride, diphenylsilanediyl(cyclopentadienyl)(4-methylfluorenyl)-zirconium dichloride, diphenylsilanediyl(cyclopentadienyl)(4-ethylfluorenyl)-zirconium dichloride, diphenylsilanediyl(cyclopentadienyl)(4-isopropylfluorenyl)-zirconium dichloride, diphenylsilanediyl(cyclopentadienyl)(4-t-butylfluorenyl)-zirconium dichloride, diphenylsilanediyl(cyclopentadienyl)(2-phenylfluorenyl)-zirconium dichloride, diphenylsilanediyl(cyclopentadienyl)(2-naphthylfluorenyl)-zirconium dichloride, diphenylsilanediyl(cyclopentadienyl)(2,7-bismethylfluorenyl)-zirconium dichloride, diphenylsilanediyl(cyclopentadienyl)(2,7-bisethylfluorenyl)-zirconium dichloride, diphenylsilanediyl(cyclopentadienyl)(2,7-bisisopropylfluorenyl)zirconium dichloride, diphenylsilanediyl(cyclopentadienyl)(2,7-bis-t-butylfluorenyl)zirconium dichloride, diphenylsilanediyl(cyclopentadienyl)(2,7-bisphenylfluorenyl)zirconium dichloride, and diphenylsilanediyl(cyclopentadienyl)(2,7-bisnaphtylfluorenyl)zirconium dichloride.

14. The process of claim 1, wherein $M^1$ is Zr.

15. The process of claim 1, wherein the (c) organometallic compound has the formula $M^4R^9_s$, wherein $M^4$ is an element of group 1, 2, or 13 of the Periodic Table, or Sn or Zn; and each of $R^9$ is independently a hydrogen atom, an alkyl or alkoxy group of 1 to 20 carbons, or an aryl, aryloxy, arylalkyl, arylalkoxy, alkylaryl, or alkylaryloxy group of 6 to 20 carbons, at least one $R^9$ being a hydrogen atom, an alkyl group of 1 to 20 carbons, or an aryl, arylalkyl, or alkylaryl group of 6 to 20 carbons; and s is equal to the oxidation number of $M^4$.

* * * * *